Patented Aug. 30, 1949

2,480,329

UNITED STATES PATENT OFFICE 2,480,329

PREPARATION OF VINYLDIACETON-ALKAMINE

Ernst H. Kastning, Mamaroneck, and Carl F. Lischer, Larchmont, N. Y., assignors to William R. Warner & Co., Inc., New York, N. Y, a corporation of Delaware No Drawing. Application October 19, 1944, Serial No. 559,480

2 Claims. (Cl. 260—293)

1

The present invention is directed generally to improving the manufacture of eucatropine hydrochloride which possesses valuable mydriatic properties because of its relative freedom from the distressing after-effects that usually accompany optical treatment with most of the common mydriatics. More particularly it relates to the synthesis of the high melting or labile form of vinyldiacetonalkamine which is an essential intermediary in the manufacture of eucatropine hydrochloride.

Heretofore, the involved procedure required for the manufacture of eucatropine hydrochloride has so added to the cost of this valuable substance as to greatly limit its application in optical treatment. The synthesis of eucatropine hydrochloride is usually accomplished by the initial ammonolysis of mesityl oxide to produce diacetonamine followed by treatment of diacetonamine with paraldehyde to yield vinyldiacetonamine. The latter substance may then be reduced to vinyldiacetonalkamine, thereafter converted to N-methyl vinyldiacetonalkamine with formaldehyde and the resulting product treated with mandelic acid to produce eucatropine hydrochloride.

A primary difficulty encountered in the manufacture of mydriatic eucatropine hydrochloride has resided in the preparation of vinyldiacetonalkamine which has been effected either by reduction with sodium amalgam or by the use of electrolysis. When the reduction is carried out with sodium amalgam approximately equal amounts of high and low melting sterio-isomeric forms of vinyldiacetonalkamine result which must be separated since the compound ultimately produced from the low melting form does not possess mydriatic properties.

In practicing the electrolytic reduction of vinyldiacetonamine a time period of from approximately one to four weeks is required to complete the reaction depending on the efficiency of the equipment throughout which reaction period extreme care must be exercised to maintain the proper alkaline pH in the electrolytic bath. The electrolytic reduction of vinyldiacetonamine, moreover, is only feasible in relatively dilute solutions contributing further to the gross inefficiency of the process and materially increasing the cost of eucatropine hydrochloride.

The main object of the present invention is to improve the efficiency of the process for the manufacture of eucatropine hydrochloride.

Another object of the present invention is to reduce the cost of manufacturing eucatropine hydrochloride.

2

Another object of the present invention is to provide a process for greatly increasing the yield of mydriatic eucatropine hydrochloride.

Another object of the present invention is to provide an improved method for the reduction of vinyldiacetonamine.

Another object is to provide a process of producing a reduction product of vinyldiacetonamine consisting essentially of the high melting vinyldiacetonalkamine.

It is further the object of the present invention to provide a process of producing reduction products of vinyldiacetonamine in considerably shorter time than possible heretofore.

The present invention contemplates subjecting the vinyldiacetonamine to catalytic hydrogenation with a nickel catalyst to produce the high melting or labile vinyldiacetonalkamine. The process is preferably carried out with agitation and at a relatively elevated pressure in the presence of a solvent for the vinyldiacetonamine. The reaction temperature may be varied within wide limits.

It has been discovered that catalytic hydrogenation of the vinyldiacetonamine with a nickel catalyst results directly in the formation of a product consisting essentially of the high melting form of vinyldiacetonalkamine in high yield and with a very substantial reduction of the prolonged reaction period required in prior practice. The conservation of material and increase in production capacity thereby accomplished contribute materially to the reduction in manufacturing cost of mydriatic eucatropine hydrochloride.

The process of the invention may be carried out, for example, by charging a suitable hydrogenation unit equipped for agitation with vinyldiacetonamine, a comminuted nickel catalyst and suitable solvent for the vinyldiacetonamine, introducing hydrogen under pressure to the reaction mixture and agitating the reaction mixture with or without the addition of heat until the reaction is complete.

The reaction proceeds at a somewhat higher rate with the application of a moderate degree of heat, although in many cases the reaction may be satisfactorily completed in a relatively short period of time even when carried out at room temperature.

The temperature of reaction may vary from that of the room to about 180° C. depending largely upon the pressure and time of reaction. Temperatures substantially above 180° C. cause decomposition and are to be avoided.

The reaction mixture is preferably maintained under a hydrogen pressure of about 1500 pounds per square inch to about 3000 pounds per square inch, while subjected to agitation to promote the rapid reduction of the vinyldiacetonamine to vinyldiacetonalkamine. The reaction may be considered as being substantially complete when the hydrogen pressure in the reaction vessel has become substantially constant.

The following examples are given by way of explanation and not in limitation of the invention.

1. Into a hydrogenation unit of 500 ml. capacity place 50 grams of distilled vinyldiacetonamine, 145 ml. methanol and 4 grams of Raney nickel catalyst. After purging the unit of oxygen, introduce hydrogen to a pressure of 1600 p. s. i. and agitate the unit at 90° C. for 4 to 5 hours until the hydrogen pressure drops to a constant value. After the unit has cooled to room temperature, release the hydrogen, separate the catalyst and remove the methanol. There remains 45 to 47.5 grams of high melting vinyldiacetonalkamine melting at approximately 162° C.

2. In a hydrogenation unit of 500 ml. capacity place 50 grams of distilled vinyldiacetonamine, 4 grams of Raney nickel catalyst and 145 ml. of methanol. Purge the unit of oxygen and introduce hydrogen to a pressure of 1630 p. s. i. and shake the unit at room temperature for 24 hours. Removal of catalyst and solvent leaves 47 grams of pure high melting vinyl-diacetonalkamine melting at approximately 162° C.

3. 50 grams of distilled vinyldiacetonamine, 145 ml. of methanol and 4 grams of Raney nickel catalyst are shaken 2½ hours with hydrogen at an initial pressure of 1600 p. s. i. and a temperature of 130° C. After the catalyst and solvent are removed there remains 47 grams of high melting vinyldiacetonalkamine melting at approximately 162° C.

4. 4 grams of nickel pellet catalyst (U. O. P.) triturated with 145 ml. methanol, and 50 grams of distilled vinyldiacetonamine are agitated at 92° C. with hydrogen at 1600 p. s. i. for 5 hours. There remains, after the catalyst and solvent are removed, 44.7 grams of pure high melting vinyldiacetonalkamine The labile vinyldiacetonamine produced as above may be boiled with formaldehyde to form N-methyl vinyldiacetonalkamine which is then treated with mandelic acid to produce the mydriatic eucatropine hydrochloride.

The remarkable facility with which the labile form of vinyldiacetonalkamine may be prepared by virtue of the present invention is evident from the foregoing examples. The reaction may in many cases be completed in a period of a relatively few hours to yield high melting or labile vinyldiacetonalkamine of high quality as compared with a matter of weeks in known procedures. The process materially improves the manufacture and enables a considerable reduction in the cost of producing eucatropine hydrochloride.

Since many changes could be made in the specific procedure herein presented, it is intended that all matter contained in the above description shall be interpreted as illustrative and not in limitation of the invention, the scope of which is defined by the following claims.

We claim:

1. A process for the manufacture from vinyldiacetonamine of a product consisting substantially of the form of vinyldiacetonalkamine melting at approximately 162° C. which consists in subjecting the vinyldiacetonamine to hydrogenation in the presence of a nickel catalyst at a temperature below 180° C. and recovering the sole reaction product consisting substantially of vinyldiacetonalkamine melting at approximately 162° C.

2. A process for the manufacture from vinyldiacetonamine of a product consisting substantially of the form of vinyldiacetonalkamine melting at approximately 162° C. which consists in agitating a solution of vinyldiacetonamine under a hydrogen pressure of 1500 to 3000 pounds per square inch in the presence of a nickel catalyst at a temperature below 180° C. and recovering the sole reaction product consisting substantially of vinyldiacetonalkamine melting at approximately 162° C.

ERNST H. KASTNING.
CARL F. LISCHER.

REFERENCES CITED

The following references are of record in the file of this patent:

UNITED STATES PATENTS

| Number | Name | Date |
|---|---|---|
| 2,045,574 | Adkins | June 30, 1936 |
| 2,108,133 | McCall | Feb. 15, 1938 |
| 2,158,040 | Blumenfeld | May 9, 1939 |
| 2,200,216 | Loewenberg et al. | May 7, 1940 |

FOREIGN PATENTS

| Number | Country | Date |
|---|---|---|
| 95,622 | Germany | Dec. 9, 1899 |
| 312,919 | Great Britain | Aug. 29, 1930 |
| 314,019 | Great Britain | Oct. 13, 1930 |

OTHER REFERENCES

Heilbron, Dictionary of Organic Compounds, vol. III; pages 917 and 918.